United States Patent [19]

Shaffer et al.

[11] Patent Number: 4,928,978
[45] Date of Patent: May 29, 1990

[54] ROTATING SHAFT SEAL

[75] Inventors: Harold K. Shaffer, Tolland; Roger M. Barnsby, Manchester, both of Conn.

[73] Assignee: United Technologies Corporation, Hartford, Conn.

[21] Appl. No.: 178,694

[22] Filed: Apr. 7, 1988

[51] Int. Cl.⁵ .......................... F16J 15/16; F16J 15/42
[52] U.S. Cl. .......................................... 277/25; 277/74; 277/75
[58] Field of Search .................. 277/25, 75, 24, 74, 277/53, 81 R, 67, 68; 415/175, 110

[56] References Cited

U.S. PATENT DOCUMENTS 4,406,459  9/1983  Davis et al. .......................... 277/25
4,406,460  9/1983  Slayton ................................ 277/25

FOREIGN PATENT DOCUMENTS 1155958  5/1958  France ................................. 277/25
 406192  2/1934  United Kingdom ................. 277/67

Primary Examiner—Allan N. Shoap
Attorney, Agent, or Firm—Edward L. Kochey, Jr.

[57] ABSTRACT

Seal 20 and seal ring 26 form annulus 36 which collects weepage oil which is removed through holes 54. Air flow pumped by face 58 of seal ring 26 is minimized by locating flange 64 close to the outer radius of the seal ring, thereby facilitating collection of all weepage oil.

5 Claims, 3 Drawing Sheets

ROTATING SHAFT SEAL

TECHNICAL FIELD

The invention relates to seals on high speed rotating shafts and in particular to weepage of oil lubricated seals.

BACKGROUND OF THE INVENTION

In a gas turbine engine the bearing compartment must be sealed from the higher pressure and higher temperature environment of the turbine gas flow. Carbon seals are frequently used and because of the high speed rotation of the gas turbine engine, such seals must be lubricated to minimize friction and wear as well as to provide some cooling.

For this purpose oil is delivered to slight recesses in the interface between the seal and seal plate. The higher gas pressure is located at the inner diameter of the seal. Despite centrifugal force and gas pressure tending to urge the oil out from the seal into the bearing chamber some oil finds its way into the gas side of the seal. If this oil finds its way into the main gas flow, it will cause contamination of the blading and/or fires. It is important therefore, to return this oil to the bearing chamber.

U.S. Pat. No. 4,406,459 to Joseph Davis et al issued Sept. 27, 1983 is directed to returning the weepage oil to the bearing chamber. An inwardly facing annulus is formed at the interface between the carbon seal and the seal plate with centrifugal forces retaining a pool of oil within this annulus. Oil passages are provided passing through the seal plate from the location in the annulus to a radially outward position so that these passages operate as a pump to centrifugally pump oil from the annulus area.

Testing has shown that with this arrangement not all of the oil is returned. In some manner a portion of the oil flow, possibly in the form of a spray, is carried into the main gas flow of the gas turbine.

SUMMARY OF THE INVENTION

It is an object of the invention to improve the recovery of weepage oil to avoid passing a portion thereof into the gas flow path.

It is theorized that the boundary air flow pumped along the face of the seal support structure interferes with puddling of the oil in the annulus and possibly atomizes a portion of the oil whereby it escapes rather than being returned to the bearing chamber. In accordance with the invention therefore, the structure is modified to reduce the boundary flow pumped by the seal support to minimize air flow caused turbulence in the area.

In a conventional manner a circular seal ring (seal plate) rotating with the shaft has a radial seal face which interfaces with the stationary carbon seal element and oil is supplied to the seal interface. The seal element and the seal ring (seal plate) are shaped to form an inwardly facing annulus capable of retaining oil weeping through the seal. At least one passage through the seal ring (seal plate) is supplied for pumping of oil the annulus back to the bearing chamber.

An axially extending flange integral with the seal ring (seal plate) divides the radial exposed face into inner and outer annular portions. This reduces the radial extent of the outer portion to a distance of less than 8 percent of the outside radius of the support plate and preferably to less than 6 percent.

DESCRIPTION OF THE PREFERRED EMBODIMENT

Figure 1:
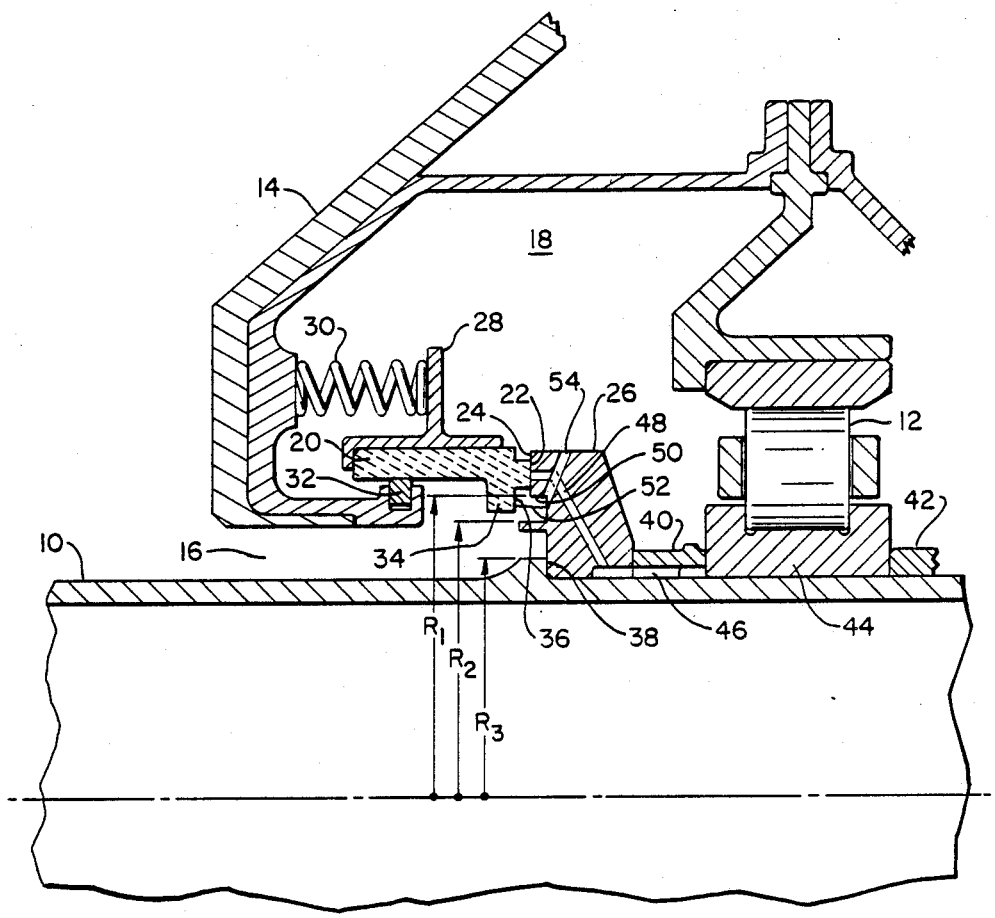
FIG. 1 is a sectional elevation through the seal area.

A gas turbine shaft 10 rotating at a high speed on the order of 8,000 to 15,000 RPM is supported on roller bearing 12 located within bearing chamber 14. A gas annulus 16 is exposed to the hot gas flow path which may reach temperatures exceeding 1,000 F. Knife edge seals may if desired be located in this gas annulus to deter recirculating gas flow in the annular space. Such knife edge seals, however, would not be sufficiently tight to lend any sealing assistance to preclude leakage of the gas to the interior 18 of the bearing compartment.

For this tight sealing purpose a carbon seal 20 has a radial seal surface 22 which is in interfacial contact with the radial seal face 24 at the outer periphery of a circular seal ring 26 (also known in the art as a seal plate).

The carbon seal 20 is located on a seal carrier 28 with the assembly being urged by spring 30 into sealing contact. Piston ring 32 seals the inner circumference of the seal while permitting axial movement of the seal. An inwardly extending portion 34 of the seal overlies a portion of the seal face 22 to form one edge of an inwardly facing annulus 36 adjacent to the seal interface.

The seal ring 26 is held against shoulder 38 of shaft 10 by spacer sleeves 40 and 42 as well as bearing race 44 all of which are restrained by a locking means not shown.

An oil flow path includes axial slots 46 through spacer 40 in fluid communication with a number of radial oil supply holes 48 located within the seal ring. Each of these holes supplies a slight recess in the radial seal face 24 with the flow from this seal face passing through openings, not shown, into bearing compartment 18.

There are perhaps 30 of these recesses around the periphery of the seal face providing ample oil flow for cooling and minimizing wear of the seal. A portion of this oil flow, however, migrates inwardly toward annular space 16.

The seal ring 26 also has an inwardly facing shoulder 50 which cooperates with the seal to form an inwardly facing annulus 36. Weepage oil is collected in a pool 52 held within this annulus by centrifugal force. Two holes 54 are located in the seal ring passing from the outer edge of the annulus 36 to the outer periphery of the seal ring. These holes provide substantial pumping action when filled with oil because of the centrifugal action thereon while functioning as a flow restriction when only air exists. These holes are carefully sized to provide the desired compromise between sufficient pumping to avoid oil buildup and excessive leaking into the bearing compartment.

Figure 2:
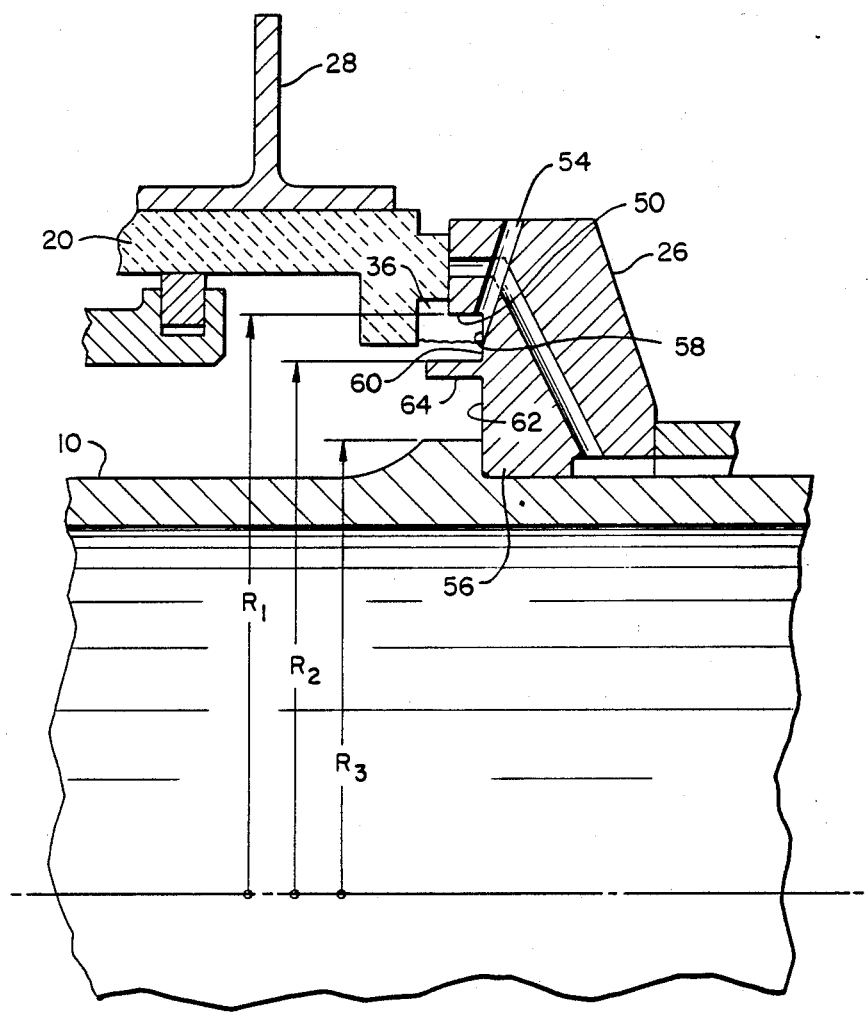
FIG. 2 is an expanded view showing the seal arrangement in more detail.

The circular seal ring (FIG. 2) includes a radial support 56 and has a radial exposed face 58 which is divided into an outer portion 60 and an inner portion 62 by flange 64.

Inwardly facing shoulder 50 at the outer periphery of the radial support portion has a radius of R1 of 2.95 inches. The radius of the outside edge of flange 64 indicated as R2 is 2.79 inches while radius R3 at the shoulder of the shaft is 2.67 inches. It is pointed out that the ratio of R2 to R1 is 0.945 and accordingly the radial extent of outer portion 60 is 5½ percent of the radius formed by shoulder 50 at the outer periphery of the radial exposed face.

Figure 3:
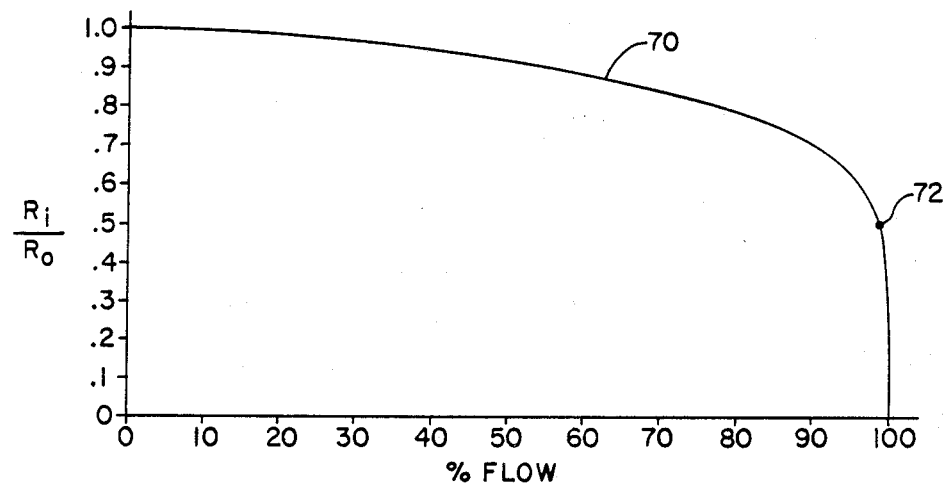
FIG. 3 is a plot of flat plate pumping action.
Figure 4:
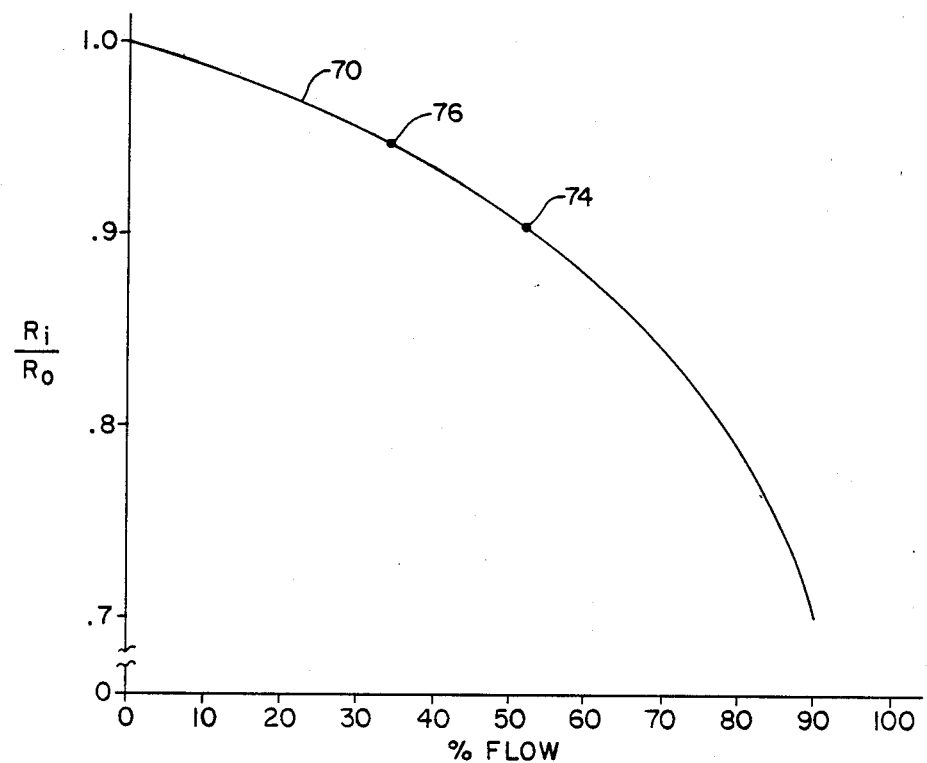
FIG. 4 is an expanded plot of a portion of FIG. 3.

In FIG. 3 curve 70 illustrates generically the pumping action as a function of the ratio of inside radius of a plate to the outside radius of the plate, expressed in the percentage of the flow produced by a full plate. The pumping action varies as $(1-(Ri/Ro)^{5.75})$, where Ro is the outside radius of the plate and Ri is the inside radius. It can be seen that little difference in flow occurs as the plate changes from a full disk to an annular plate with 50 percent inside radius (point 72), but the change in flow becomes much more significant as the residual annular portion of the plate becomes small. The same curve is shown in more detail in FIG. 4.

Tests were carried out on the prior art apparatus with an actual R2 equal to 2.67 inches which had a ratio of R2 to R1 of 0.905 (the radial extent of the exposed face therefore being 9.5 percent of the outside radius) with significant oil leakage being encountered. Following our theory it should be noted that in accordance with the generic curve this results in an air flow generated in the order of 52 percent of maximum (point 74), which we believe to be the cause of lack of recovery of the oil.

Tests using the flange to set the diameter R2 equal to 2.79 inches and accordingly the ratio of R2 to R1 of 0.945 resulted in a marked improvement in oil weepage recovery (point 76). This represents a radial distance from the flange to the periphery of the radially exposed face of 5.5 percent in accordance with the curve shows the pumped flow dropping to 34 percent of the maximum flow.

Some radial distance of the outer portion 60 is required in order to form a collecting pool for the oil and to permit the oil to move circumferentially to the outlets. Sufficient radial distance must also exist so that flange 64 will not interfere with inwardly extending portion 34 of carbon seal 20 as the seal face 22 wears. It is noted that there is a marked change in air flow pumped for even slight changes in the ratio of radii in this area and that a ratio where the radial distance of the annulus is less than 8 percent of the outside radius, offers significant improvement while a similar ratio of 6 percent offers a still further substantial improvement.

I claim:

1. A rotating shaft seal arrangement comprising:
a high speed rotating shaft;
a circular seal ring rotating with said shaft and having a radial seal face near its outer periphery, said seal ring also including a radial support portion supporting said seal face and having a radial exposed face radially inward of said seal face;
a stationary fixed seal element having a radial seal surface, in interfacial sealing contact with said seal face;
means for supplying oil to the interface between said seal face and said seal surface;
said seal element and said seal ring shaped to form an inwardly facing circumferential annulus at the inner edge of said seal surface and said seal face;
said seal ring having at least one hole through said seal ring from said annulus to the outer periphery of said seal ring; and
an axially extending flange integral with said seal ring dividing said radially exposed face into inner and outer annular portions.

2. A rotating shaft seal arrangement as in claim 1:
the radial distance from said flange to the periphery of said radial exposed face being less than 8 percent of the radius of the periphery of said radial exposed face.

3. A rotating shaft seal arrangement as in claim 2:
the radial distance from said flange to the periphery of said radial exposed face being less than 6 percent of the radius of the periphery of said radial exposed face.

4. A rotating shaft seal arrangement comprising:
a high speed rotating shaft;
a circular seal ring rotating with said shaft and having a radial seal face near its outer periphery, said seal ring also including a radial support portion supporting said seal face and having a radial exposed face radially inward of said seal face;
a stationary fixed seal element having a radial seal surface, in interfacial sealing contact with said seal face;
means for supplying oil to the interface between said seal face and said seal surface;
said seal element and said seal ring shaped to form an inwardly facing circumferential annulus at the inner edge of said seal surface and said seal face;
at least one hole through said seal ring from said annulus to the outer periphery of said seal ring;
said radial exposed face having an outer periphery and having an uninterrupted radial extent inwardly from its outer periphery;
the uninterrupted radial extent of said radial exposed face from its outer periphery not exceeding 8 percent of the radius of said outer periphery of said radial exposed face; and
said seal ring including an axially extending inwardly facing shoulder forming a portion of said annulus at the outer periphery of said radial exposed face.

5. A rotating shaft seal arrangement as in claim 4:
the uninterrupted radial extent of said radial exposed face from its outer periphery not exceeding 6 percent of the radius of said outer periphery of said radial exposed face.

* * * * *